United States Patent Office 3,087,960
Patented Apr. 30, 1963

3,087,960
ALKALI METAL SALTS OF DIGLYCOL BORATES AND METHODS FOR PREPARING THE SAME
Marlene Denny, Honolulu, Hawaii, and Chien-wei Liao, Beachwood, Ohio, assignors to The Standard Oil Company, Cleveland, Ohio, a corporation of Ohio
No Drawing. Filed Nov. 13, 1961, Ser. No. 152,070
9 Claims. (Cl. 260—462)

This invention pertains to a method for preparing novel compounds containing boron and to the compounds so prepared.

The compounds prepared by the method of the present invention have the following general formula:

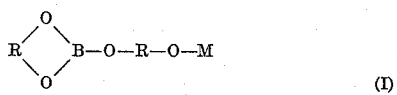
(I)

where R is an alkylene group, preferably an alpha or beta alkylene group, containing from 4 to 12 carbon atoms. The above general formula is intended to include compounds in which the alkylene radical may be the same, or it may be different for the two positions shown for R; for example, where one R is hexylene and the other R is butylene. M is an alkali metal such as sodium, potassium, or lithium.

These compounds find utility as intermediates for the preparation of final compounds useful as gasoline additives. The virtues of gasoline compositions containing the final compounds are set forth in co-pending application Serial No. 13,979, filed March 10, 1960, now U.S. Patent 3,013,046, assigned to our assignee. The disclosure of the latter co-pending application is incorporated herein by reference to the extent that may be required for a clear and complete understanding of the utility of the final compounds derived from the herein disclosed intermediates.

The method of the present invention for preparing the above-described boron compounds involves essentially a two-step process. The first step consists of forming a diglycol borate and the second step consists of forming the mono-alkali metal salt by reacting an alkali metal source with the diglycol borate. The latter compound has the following general formula:

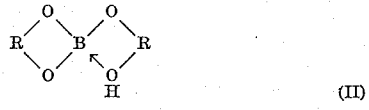
(II)

in which R is as defined heretofore.

In the first step of the process, 2 mols of glycol having the formula

is reacted with one mole of boric acid (or the molal equivalent amount of boric acid) and the water of reaction removed, preferably by azeotropic distillation to give the compound (II).

In preparing the diglycol borate salt, the diglycol borate is dissolved in a solvent and reacted with an alkali metal source at elevated temperatures. The source may be the pure alkali metal introduced in small pieces or in the form of a fine dispersion, but preferably the reaction is conducted with the hydroxide of the alkali metal under conditions so that the water of reaction that forms is removed. The alkali metal hydroxide is preferably added as an aqueous solution but may be employed in the reaction if desired in pellet form. The water of reaction, as well as any water introduced with the reactants, may be removed by air blowing or simple boiling, but it is preferred to accomplish this by azeotropic distillation. The reaction temperature of the process is preferably held below 100° C. since diglycol borates have a tendency to decompose above this temperature. Accordingly, when the water of reaction is removed by azeotropic distillation in accordance with the most preferred embodiment of the process, it is desirable to select a solvent which azeotropes with water below 100° C. Illustrative examples of suitable solvents for this step of the reaction are benzene, toluene, xylene, cyclohexane, normal pentane, normal hexane, normal heptane, and naphtha blends boiling in the range of from 80 to 100° C.

The following examples illustrate the best mode contemplated for carrying out the method of the present invention, but are not intended to limit the invention in any way.

EXAMPLE I(a)

The diglycol borate was prepared from 52 g. (.5 M) of 2,2-di-methyl propanediol-1,3 and 15.4 g. (.25 M) of boric acid in 250 ml. of benzene. The two reactants were placed into a 1 liter three-necked flask, which was equipped with a mechanical stirrer and an azeotropic trap of 25 ml. capacity connected with a condenser. The reaction vessel was protected from the atmosphere by a drying tube containing anhydrous calcium chloride. The tube was attached to the top of the condenser. The reaction mixture was then heated at benzene reflux until water formation stopped. Theoretical amount of water to be formed: 13.5 ml. Amount of water found: 13.3 ml. or 98.8% of the theoretical. Most of the solvent was stripped off under slight vacuum. The residue was a white solid, which was recrystallized from naphtha. A white crystalline solid (36.6 g.) was obtained at M. Pt. 130° C. (The diol had a melting point of 112–116° C. and was insoluble in paraffinic naphtha, but has a limited solubility in highly aromatic naphtha.) This diglycol monoborate is unique in being a crystalline solid with a sharp melting point. The diglycol monoborates above and below this compound in the homologous series are liquids which cannot be recrystallized or are resinous in character due to the polymerization. Attempts to distill the homologous liquid borates causes them to revert to the triglycol diborate form. The compound of this example is unusual in that it can be isolated as a solid and purified by recrystallization, and is the only diglycol monoborate which, as far as is known, can be treated in this way. It can be used as the starting material for the following example:

| Analysis | Th. | Fd. |
|---|---|---|
| Percent Boron | 5.01 | 5.00 |
| Percent Carbon | 55.56 | 54.18 |
| Percent Hydrogen | 9.73 | 9.43 |
| Mol. Weight | 216 | 222.5 |

EXAMPLE I(b)

The reaction vessel was a 1 liter three-necked flask, equipped with a dropping funnel (with vapor by-pass), a mechanical stirrer and a condenser. A gas outlet from the top of the condenser was connected to a calcium chloride tube which was connected to a gas measuring device. This consisted of a one liter suction flask filled half-way with water. During the course of the reaction the water was pushed from this flask into a graduated cylinder by the hydrogen which was formed as the reaction byproduct. The water levels in both the flask and the graduated cylinder were equalized before taking a reading. The volume of water which had been displaced was assumed to equal the volume of hydrogen formed at 25° C., and atmospheric pressure.

Metallic sodium (1.15 g.) (.05 M) was placed in the reaction vessel along with approximately 300 cc. of toluene. The solvent was heated to reflux with stirring. When the boiling point was reached, the gas measuring device was connected to the gas outlet via the calcium chloride tube, the water layers in both the flask and the cylinder were equalized and 10.8 g. of di-(2,2-di-methyl propanediol-1,3) borate (.05 M) dissolved in 80 cc. of toluene were added from the dropping funnel over a period of 40 minutes. The reaction mixture turned dark brown at first and then milky white because of the formation of a gelatinous solid. (This was the only instance where the formation of a dark brown color was observed. With other di-glycol borates the reaction mixture turned milky white as soon as some reaction product had been formed.) Hydrogen evolution proceeded smoothly and was complete after 2¼ hours. Theoretical amount of $H_2$ to be formed: .025 M=560 cc. at S.T.P.

The amount of $H_2$ formed: 590 cc. at 25° C. and 760 mm.=540 at S.T.P. (96.5% of the theoretical).

The reaction mixture was cooled to room temperature and was then filtered with suction. The filtration residue was washed with several portions of ethyl ether to facilitate drying. The write crystalline product was oven dried at 80° C. for 15 hours and weighted then 10.5 g.; 88.5% of the theoretical.

The toluene filtrate was combined with the ethyl ether washings and was then stripped to dryness on a rotary evaporator under mild vacuum (300 mm.).

A neutral equivalent determination was run on the product. Samples (.3 g.) were weighted out accurately on an analytical balance, dissolved in 10 cc. of distilled water, heated briefly on a hot plate until the samples were completely dissolved and then titrated with standard .1 N HCl in the presence of 1 drop of methyl purple indicator (titrated to pale purple end point).

Neutral equivalent found _____ 235.55±.35
Theoretical value _____ 237.97

Since the experimental value indicated that the product was of 99.1% purity no further purification was attempted.

Analysis of the unrecrystallized material:

|  | Th. | Fd.[1] |
|---|---|---|
| Percent C | 50.43 | 49.96 |
| Percent H | 8.47 | 8.43 |
| Percent Na | 9.66 | 9.62 |
| Percent B | 4.55 | 4.48 |

[1] All elemental analyses except Boron by Huffman Microanalytical Laboratories, Wheatridge, Colorado.

EXAMPLE I (c)

10.8 g. (.05 M) of the diglycol borate prepared as previously described in Example I(a) were dissolved in 400 ml. of cyclohexane and placed in the reaction flask. The solution was heated to reflux. 1.8 g. of sodium hydroxide pellets of 97% purity (.045 M) were dissolved in 7 ml. of distilled water and were then added dropwise from the addition funnel to the clear borate solution. A white, voluminous solid began to form immediately upon addition of the first few drops of base and water was distilled over into the azeotropic trap. The addition of sodium hydroxide was completed after 10 minutes. Only 1.5 ml. of water had been collected at this point. After a total heating period of 5.75 hours 6.7 ml. of water had been collected. Heating and stirrings were continued for an additional 7 hours, but no more water could be distilled out. The theoretical amount of water was calculated to be 7.0 ml.+.81 ml. (.045 M formed during the reaction). Since the reaction mixture was extremely gelatinous, it may have a tendency to occlude some of the water, therefore making its removal by this method impossible. Heating was discontinued, the flask contents were cooled to room temperature and the white crystalline product was separated by suction-filtration. After oven-drying at 80° C. for 15 hours 10.0 g. of product was obtained. The theoretical yield was 10.7 g.—98.8% yield. A neutral equivalent was determined on the crude product according to the method outlined above. The value obtained was 222.6±.6. Since this was considerably lower than the calculated value of 237.97 the product was further purified by recrystallization from ethanol. It came out of this solvent in very fined, well defined needles. The purified material was again oven-dried at 80° C. It then had a neutral equivalent of 232.0±.5 which indicates a purity of 97.5%.

Analyses of the recrystallized product (calculated for $C_{10}H_{20}O_4Na$).

|  | Th. | Fd. |
|---|---|---|
| Percent C | 50.43 | 50.03 |
| Percent H | 8.47 | 8.33 |
| Percent Na | 9.66 | 9.99 |
| Percent B | 4.55 | 4.55 |

The analytical results obtained for the products prepared by these two different synthetic routes agreed very well with those calculated for the postulated sodium derivative. Subsequently, these derivatives were inspected by X-ray, IR and NMR techniques. While X-ray diffraction showed the absence of sodium hydroxide and boric acid, NMR data obtained with both a boron and proton probe showed them to be highly tetracoordinated. The infrared studies support this conclusion.

Sodium salts of butanediol-2,3 borate and -1,3 as well as pentanediol-2,4 borates were also prepared by the same two methods. Their analytical data again checked excellently, with those of the postulated diglycol borate structure. The data of their preparations and analyses are tabulated in Tables I and II.

Table I
PREPARATION AND ANALYSES OF SODIUM DIGLYCOL BORATES
(Na Method)

| Glycol | $H_2$* | | Percent Yield | Recryst. Solv. | N.E. | | Percent C | | Percent H | | Percent Na | | Percent B | |
|---|---|---|---|---|---|---|---|---|---|---|---|---|---|---|
|  | Th. | Fd. |  |  | Th. | Fd. | Th. | Fd. | Th. | Fd. | Th. | Fd. | Th. | Fd. |
| Butanediol-2,3 | 2,450 | 2,355 | 100 | i-propanol | 209.90 | 207.9 | 45.73 | 44.54 | 7.68 | 7.82 | 10.95 | 11.46 | 5.15 | 5.16 |
| Butanediol-1,3 | 2,240 | 2,150 | 96 | ethanol | 209.9 | 202.15 | 45.73 | 44.53 | 7.68 | 7.61 | 10.95 | 11.32 | 5.15 | 4.92 |
| 2,2-di-meth. propanediol-1,3 | 560 | 540 | 88.5 | do | 237.97 | 235.55 | 50.43 | 49.96 | 8.47 | 8.43 | 9.66 | 9.62 | 4.55 | 4.48 |
| Pentanediol-2,4 | 1,120 | | 82.9 | do | 237.97 | 243.8 | 50.43 | 46.56 | 8.47 | 8.58 | 9.66 | 9.64 | 4.55 | 4.91 |

*$H_2$ volumes at STP.

Table II
PREPARATIONS AND ANALYSES OF SODIUM DIGLYCOL BORATES
(NaOH Method)

| Glycol | H₂O* | | Percent Yield | Recryst. Solv. | N.E. | | Percent C | | Percent H | | Percent Na | | Percent B | |
|---|---|---|---|---|---|---|---|---|---|---|---|---|---|---|
| | Th. | Fd. | | | Th. | Fd. | Th. | Fd. | Th. | Fd. | Th. | Fd. | Th. | Fd. |
| Butanediol-2,3 | 15.5 | 12.4 | 99.0 | i-propanol | 209.9 | 215.2 | 45.73 | 44.74 | 7.68 | 7.79 | 10.95 | 10.70 | 5.15 | 4.99 |
| Butanediol-1,3 | 192 | 178 | 98.0 | ethanol | 209.9 | 201.2 | 45.73 | 44.34 | 7.68 | 7.58 | 10.95 | 11.10 | 5.15 | 5.11 |
| 2,2-di-methyl propanediol-1,3 | 7.81 | 6.7 | 93.4 | ___do___ | 237.97 | 232.0 | 50.43 | 50.03 | 8.47 | 8.33 | 9.66 | 9.99 | 4.55 | 4.55 |
| Pentanediol-2,4 | 8.4 | 6.8 | 90 | i-propanol | 237.97 | 235.2 | 50.43 | 46.45 | 8.47 | 8.55 | 9.66 | 9.15 | 4.55 | 5.02 |

*The theoretical amount of H₂O is calculated as the sum of the water used to dissolve the sodium hydroxide and the water formed in the reaction.

It is to be understood that various modifications of the foregoing invention will occur to those skilled in the art upon reading the above description. All such modifications are intended to be included as may be reasonably covered by the appended claims.

We claim:

1. A method for preparing compounds of the following general formula:

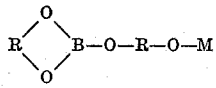

wherein R is an alkylene group containing from 4 to 12 carbon atoms and M is an alkali metal, consisting of forming a mono-alkali metal salt of a diglycol borate compound of the general formula:

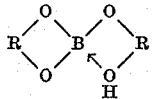

in which R is defined as above, by reacting said diglycol borate compound with an alkali metal source selected from the group consisting of an alkali metal in finely divided form and an alkali metal hydroxide.

2. A method for preparing compounds of the following general formula:

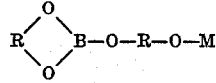

wherein R is an alkylene group containing from 4 to 12 carbon atoms and M is an alkali metal, consisting of forming a mono-alkali metal salt of a diglycol borate compound of the general formula:

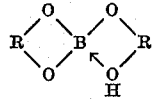

in which R is defined as above, by reacting said diglycol borate compound dissolved in a solvent which azeotropes with water under about 100° C. with an alkali metal hydroxide at the azeotropic distillation temperature to remove water from the reaction mixture.

3. A method for preparing compounds of the following general formula:

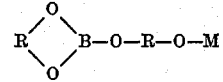

wherein R is an alkylene group containing from 4 to 12 carbon atoms and M is an alkali metal, consisting of forming a mono-alkali metal salt of a diglycol borate compound of the general formula:

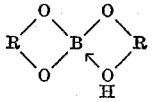

in which R is defined as above, by reacting said diglycol borate compound in an essentially inert non-aqueous solvent with a metallic alkali metal and removing the hydrogen formed.

4. Compounds of the following general formula:

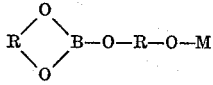

wherein R is an alkylene group containing from 4 to 12 carbon atoms, and M is an alkali metal.

5. A compound having the formula:

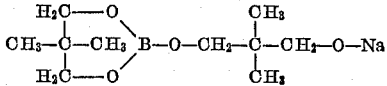

6. A compound having the formula:

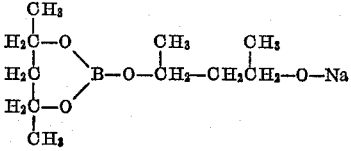

7. A compound having the formula:

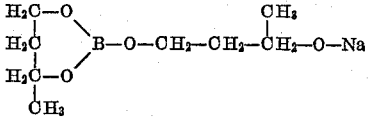

8. A compound having the formula:

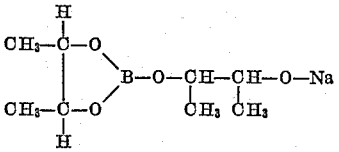

9. A compound having the formula:

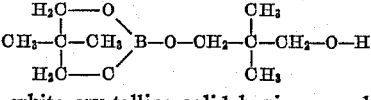

which is a white crystalline solid having a melting point of 130° C.

No references cited.